UNITED STATES PATENT OFFICE.

JOSEPH A. BRADBURN, OF SYRACUSE, NEW YORK.

PROCESS OF OBTAINING POTASSIUM CHLORID.

1,156,388.   Specification of Letters Patent.   Patented Oct. 12, 1915.

No Drawing.   Application filed July 2, 1915.   Serial No. 37,694.

*To all whom it may concern:*

Be it known that I, JOSEPH A. BRADBURN, a citizen of the United States, residing at Syracuse, in the county of Onondaga and State of New York, have invented certain new and useful Improvements in Processes of Obtaining Potassium Chlorid, of which the following is a specification.

My invention relates to processes of obtaining potassium chlorid from saline liquors, derived from natural or artificial sources.

As is well known the water of Great Salt Lake and certain other saline liquors, and the saline solids therein, contain chlorids and sulfates of the alkali metals and of the alkaline earth metals. The alkali metals present in the saline form are generally sodium and potassium, and the alkaline earth metals in such form are generally magnesium and calcium.

For the purpose of illustration, the treatment of Great Salt Lake water, in accordance with my process, will be set forth, such lake water ordinarily containing sodium chlorid, potassium chlorid, sodium sulfate, magnesium chlorid, and calcium sulfate.

It is well known, that Great Salt Lake water and certain other naturally occurring liquors, containing the above referred to salts in solution, may be subjected to evaporation and the sodium chlorid, more or less mixed with other salts, be obtained.

I have discovered that, if Great Salt Lake water or other liquors containing the salts, is evaporated to obtain the sodium chlorid, in the presence of the sodium sulfate therein, a chemical reaction occurs, resulting in the formation of magnesium sulfate. This magnesium sulfate more or less crystallizes out with the sodium chlorid, and under such conditions, more or less potassium as chlorid or sulfate also crystallizes out and is mixed with the sodium chlorid.

In the practice of my process in its preferred form, and before removing any sodium chlorid from the liquor, I subject the lake water or other liquor under treatment to refrigeration, by reducing its temperature to preferably approximately 18° below zero C. This refrigeration or lowering of the temperature of the liquor, which may be accomplished by natural or artificial means as either may be advantageously employed in the practice of my process, causes the greater portion of the sodium sulfate to crystallize out. The crystallized sodium sulfate thus produced is removed by settling, filtering or otherwise, thus obtaining a liquor containing only a small portion of the original sodium sulfate, present in the liquor, and therefore containing only a small percentage of the original $SO_4$. In this manner, I retain the magnesium, as magnesium chlorid, in the liquor. The quantity of sodium sulfate remaining in the liquor will depend largely upon the degree and duration of the refrigeration or cooling of the liquor.

The liquor freed from the greater part of the sodium sulfate, is next subjected to either artificial or natural evaporation, preferably natural evaporation, called "solar" evaporation, taking place in large ponds, in the open air. This evaporation, either natural or artificial, is continued until there is obtained a liquor containing about one part by weight of potassium chlorid to from two to three parts by weight of sodium chlorid, such liquor also containing nearly all the original magnesium chlorid, but only a small quantity of the original sodium sulfate. As a result of this evaporation, I have found that about 75 per cent. by weight of the sodium chlorid, 50 per cent. by weight of the sodium sulfate and 95 percent. by weight of the calcium sulfate, existing in the liquor before evaporation, are separated or crystallized out. This concentrated liquor now contains nearly all of the potassium chlorid and magnesium chlorid, present in the liquor before evaporation, and also about two to three parts by weight of sodium chlorid for each part by weight of potassium chlorid present, as above stated.

To the liquor thus treated, I add a solution of magnesium chlorid (which is later obtained in the process as a by-product) preferably in such quantity that in the resultant liquor of solution there is about two parts by weight of magnesium chlorid to one part by weight of potassium chlorid. The liquor or solution is then subjected to a hot or rapid evaporation, which may be carried on in open pans or receptacles or in vacuum pans. This hot evaporation crystallizes out of from 70 to 90 per cent. of the sodium chlorid present while the potassium chlorid and magnesium chlorid remain in solution. The solution thus treated and while hot, is allowed to settle or is filtered or both, from the crystals of sodium chlorid and is then introduced into preferably shallow crystallizing pans. The liquod introduced into these crystallizing pans is allowed to cool either by nutural or artificial cooling, whereby crude crystals of potassium chlorid, with smaller quantities of sodium chlorid and magnesium salts crystallize or separate out from the liquor.

The crude crystals of potassium chlorid, when separated from the liquor by filtration or the like, are subjected to a systematic washing with previous wash waters followed with fresh water and produce a product containing about 80 per cent. of potassium chlorid and 20 per cent. of other salts. The mother liquor from the crude crystals is largely a solution of magnesium chlorid, and may be advantageously used by mixing it with the liquor coming from the "solar" evaporation ponds, as above stated.

It is to be understood that the terms "refrigeration" and "evaporation" as used in the specification and claims are intended to refer to such process accomplished by either natural or artificial means.

It is further to be understood that the illustrated embodiment of the invention herewith described is to be taken as a preferred example of the same, and that various changes may be resorted to in the practice of the process and the steps thereof, without departing from the spirit of the invention or the scope of the subjoined claims.

Having thus described my invention, I claim:

1. The herein described process of treating Great Salt Lake water and other similar saline liquors for obtaining potassium chlorid, which consists in subjecting the liquor to refrigeration for crystallizing out the greater portion of the sodium sulfate, removing the crystallized sodium sulfate from the liquor, concentrating the resultant liquor by evaporation for crystallizing out the greater portion of the sodium chlorid, removing the crystallized sodium chlorid from the liquor, adding magnesium chlorid to the concentrated liquor, subjecting the resultant liquor to hot evaporation for further concentrating it and crystallizing out the greater portion of the remaining sodium chlorid, removing the last named crystallized sodium chlorid from the hot liquor, cooling the hot liquor for obtaining crude crystals of potassium chlorid, separating the crude crystals of potassium chlorid from the liquor, and washing the crude crystals of potassium chlorid.

2. The herein described process of treating Great Salt Lake water and similar saline liquors for obtaining potassium chlorid, which consists in removing from the liquor the greater portion of the sodium sulfate, concentrating the resultant liquor by evaporation whereby the greater portion of the sodium chlorid crystallizes out, removing the crystallized sodium chlorid, adding magnesium chlorid to the concentrated liquor, subjecting the resultant liquor to the action of hot evaporation for crystallizing out the greater portion of the remaining sodium chlorid, removing the last named sodium chlorid from the liquor, cooling the hot liquor for obtaining crude crystals of potassium chlorid, separating the crude crystals of potassium chlorid from the liquor, and washing the crude crystals of potassium chlorid.

3. The herein described process of treating Great Salt Lake water and similar saline liquors for obtaining potassium chlorid, which consists in subjecting the liquor to the action of refrigeration for crystallizing out the greater portion of the sodium sulfate, removing the crystallized sodium sulfate from the liquor, adding magnesium chlorid to the liquor, subjecting the resultant liquor to the action of evaporation for concentrating it and crystallizing out the sodium chlorid, removing the crystallized sodium chlorid from the liquor, cooling the liquor for obtaining crude crystals of potassium chlorid, separating the crude crystals of potassium chlorid from the liquor, and cleaning the crude crystals of potassium chlorid.

4. The herein described process of treating Great Salt Lake water and similar saline liquors for obtaining potassium chlorid, which consists in subjecting the liquor to the action of refrigeration for crystallizing out the greater portion of the sodium sulfate, removing the crystallized sodium sulfate from the liquor, adding magnesium chlorid to the liquor, subjecting the resultant liquor to the action of evaporation for concentrating it and crystallizing out the sodium chlorid, removing the crystallized sodium chlorid from the liquor, cooling the liquor for obtaining crude crystals of potassium chlorid, and separating the crude crystals of potassium chlorid from the liquor.

In testimony whereof I affix my signature, in presence of witness.

JOSEPH A. BRADBURN.

Witness:
C. L. PARKER.